(12) United States Patent
Jean et al.

(10) Patent No.: US 6,933,669 B2
(45) Date of Patent: Aug. 23, 2005

(54) PLANAR FLUORESCENT LAMP HAVING PARTICULAR ELECTRODE STRUCTURE

(75) Inventors: Ruey-Feng Jean, Tainan (TW); Chih-Fang Chen, Chu-Nan Chen (TW); Kuang-Lung Tsai, Hsinchu (TW); Lai-Cheng Chen, Taipei (TW); Shih-Hsien Lin, Hsinchu Hsien (TW); Shien-Tsung Chiang, Taipei Hsien (TW); Chun-Chien Chen, Hsinchu Hsien (TW); Cheng-Yi Chang, Taichung (TW)

(73) Assignee: Delta Optoelectronics, Inc., Hsinchu (TW)

( * ) Notice: Subject to any disclaimer, the term of this patent is extended or adjusted under 35 U.S.C. 154(b) by 131 days.

(21) Appl. No.: 09/981,860

(22) Filed: Oct. 17, 2001

(65) Prior Publication Data

US 2002/0047511 A1 Apr. 25, 2002

(30) Foreign Application Priority Data

Oct. 19, 2000 (TW) ........................... 89121895 A
Sep. 4, 2001 (TW) ...................... 89121895A01

(51) Int. Cl.$^7$ ............................ H01J 61/04; H01J 61/35
(52) U.S. Cl. .................... 313/491; 313/493; 313/494
(58) Field of Search ................. 313/493, 491, 313/494, 485, 574, 624, 626

(56) References Cited

U.S. PATENT DOCUMENTS 4,767,965 A * 8/1988 Yamano et al. ............. 313/491
4,920,298 A * 4/1990 Hinotani et al. ............ 313/493
5,461,279 A * 10/1995 Hasegawa ................... 313/493

FOREIGN PATENT DOCUMENTS

| JP | 08180838 A | * | 7/1996 | ............ H01J/61/36 |
| JP | 09245727 A | * | 9/1997 | .......... H01J/61/067 |
| JP | 2000011949 A | * | 1/2000 | .......... H01J/61/067 |

* cited by examiner

Primary Examiner—Karabi Guharay
(74) Attorney, Agent, or Firm—J.C. Patents

(57) ABSTRACT

A planar fluorescent lamp having a first panel, a second panel, a glass rim, a venting tube, and a set of electrodes. Fluorescent layers are formed on both the first panel and the second panel. The glass rim is mounted on edges of the first and second panels. A recess and a gap are formed in the glass rim; the recess is used for placing the electrodes while the gap is reserved for installing the venting tube. The first panel, the second panel, and the glass rim are so arranged so that a cavity is formed thereby. The cavity is vacuumed via the venting tube and mercury vapor and inert gas are then introduced into the cavity.

14 Claims, 13 Drawing Sheets

US 6,933,669 B2

PLANAR FLUORESCENT LAMP HAVING PARTICULAR ELECTRODE STRUCTURE

CROSS-REFERENCE TO RELATED APPLICATION

This application claims the priority benefit of Taiwan applications serial nos. 89121895 and 89121895A01, filed Oct. 19, 2000 and Sep. 4, 2001.

BACKGROUND OF THE INVENTION

1. Field of the Invention

This invention relates in general to a fluorescent lamp, and more particularly, to a planar fluorescent lamp that can be used as the backlight for a large area liquid crystal display (LCD).

2. Description of the Related Art

Having the advantages of high image quality, small volume, low driving voltage, low power consumption and a wide range of application, the liquid crystal display has been broadly applied to consuming products to replace the conventional cathode ray tube (CRT). The application of the liquid crystal display includes medium-and small-size portable television, cellular phone, camcorder, notebook computer, desktop computer, projection-type television and other computer products. However, different from the self-illuminating type display such as the plasma display panel (PDP), electro-luminescent apparatus, and light emitting diode, the liquid crystal display is a light accepting apparatus that requires an external light source to achieve the display effect. That is, most of the liquid crystal displays requires a backlight behind the display panel.

The typical backlight of the liquid crystal display includes a fluorescent lamp. Currently, the caliber of the fluorescent lamp is between 1.8 mm to 2.6 mm. The structure of the fluorescent lamp includes electrodes at two sides of a glass tube, while the interior wall of the glass tube is coated with phosphor. The glass tube is filled with mercury vapor and inert gas. By applying a voltage to the electrodes, electrons are generated to bombard the mercury vapor and inert gas, which are then agitated to an excited state. When the mercury vapor and the inert gas returns to the ground state, an ultra-violet light is emitted to excite the phosphor to generate a visible light.

As the display area of the liquid crystal display gradually increases, a planar illumination source able to emit a white light with a uniform brightness is required. However, the white fluorescent lamp is a non-planar line light source. The most direct way is to install several fluorescent lamp tubes behind the display panel. Referring to FIG. 1, a cross sectional view of an array-type back light is shown. The fluorescent lamp 100 is installed at a rear surface of the liquid crystal display panel 102 in parallel. A reflector 104 is located behind the fluorescent lamp 100. A diffuser 106 is located between the fluorescent lamp 100 and the display panel 102 to obtain the effect of a light source.

In another approach to transfer a linear light source into a planar light source, a fluorescent lamp is installed at a terminating surface of a louver to obtain the effect of a light source by edge light. Referring to FIG. 2, a cross sectional view of an edge-light-type backlight is shown. The fluorescent lamp 200 is installed on a terminating surface 202a of a light-guide board 202. A reflector 204 directs the light emitted from the fluorescent lamp 200 to the light-guide board 202 made of acrylic. A front surface of the light-guide board 202 has a diffuser 206, and a rear surface and other terminating surfaces are covered with the reflector 204, such that the light directed into the light-guide board 202 is restricted. The light entering the light-guide board 202 is reflected several times until the light-guide board 202 emits as a planar light source. The diffuser 206 is used to uniform the light emitted from the light-guide board 202.

However, the array-type back-light requires a diffuser to uniform the overall brightness thereof. When the fluorescent lamp is too close to the display panel, the profile thereof is displayed on the liquid crystal display panel to affect the display quality. Adjusting the distance between the fluorescent lamp and the display panel increases the thickness of the backlight. The liquid crystal display cannot be thinned as required. Generally speaking, the edge-light back light has a brightness uniformity superior to that of the array-type back light. However, the brightness of the edge-light type is smaller due to a poorer application efficiency of light. To solve the problem, the planar fluorescent light is used as the light source for a liquid crystal display. The current planar fluorescent lamp as shown in FIG. 3 includes two parallel glass panels 300, 302 with a glass rim 304 in between. A venting orifice 305 is located at one side of the glass rim 304 for vacuum and gas introduction. Electrodes 306 are formed in a recess 308 of the glass rim 304. The electrode leads 310 are solderly joined with the electrodes 306 to connect an external operating circuit. As the electrodes 306 are parallel to each other, the solder joint between the electrode leads 310 and the electrodes 306 has to be twisted with an angle approximate to a right angle. Thus, the electrode leads 310 occupy a significant area to reduce the illuminating area of the fluorescent lamp.

The metal for forming the electrodes in the planar fluorescent has a thermal expansion coefficient far different from that of glass. To obtain a hermetic planar fluorescent, a metal with an expansion coefficient close to that of glass is required for forming the electrode lead.

In the fabricating process of the fluorescent lamp, the yield is frequently reduced due to the difference in thermal expansion coefficient between the electrodes and the electrode leads. The fabrication cost is thus increased.

The electrodes assembly of the planar fluorescent is directional, and is inconvenient for automatic production. The fabrication of electrode is complex. Being restricted with the planar electrodes, the thinning process of the planar fluorescent lamp is affected.

In addition, a critical point of the electrode surface is caused by edge corner of the planar electrodes. While assembling the planar electrodes, fluorescent layer on the panel is easily scratched by the protruding edge.

SUMMARY OF THE INVENTION

This invention provides a planar fluorescent lamp. As rod electrodes are parallel to each other and adjacent to a glass rim, the luminescent area of the planar fluorescent lamp is increased.

The invention provides a planar fluorescent lamp, which can prevent the joint between the electrode and the electrode lead thereof from peeling during thermal process. The yield of the planar fluorescent lamp is enhanced, and the fabrication cost is reduced.

The planar fluorescent lamp provided by the present invention includes a first panel, a second panel, a glass rim, a venting tube and a set of electrodes. Both the first and second panels comprise a fluorescent layer thereon. Recesses and a gap are reserved in the glass rim for allocating tube electrodes and the venting tube. The electrodes are parallel to each other and adjacent to the glass rim. The first panel, the second panel and the glass rim enclose a cavity. Mercury vapor and inert gas are then introduced into the cavity.

In the present invention, the electrodes are soldered with solder leads. While disposing the electrodes, a recess space is not reserved. Instead, the electrode leads are directly fixed in the recesses, so that two electrodes are attached to a supporting element and parallel to each other.

In the present invention, the planar fluorescent lamp is so designed to avoid the electrode leads occupying a certain area, so as to increase the luminescent area. The peeling effect of the joint between the electrode leads and the electrodes during a thermal process is also prevented.

The electrode design of the planar fluorescent of the present invention, the electrode leads are pre-formed, so that a neck area is produced to enable the electrode releasing enough thermal stress during the thermal process.

In the electrode design of the planar fluorescent provided by the present invention, the soldered electrodes and electrode leads are bent to reserve a flexible space, so as to allow the electrodes to release thermal stress during the thermal process.

In the electrode design of the planar fluorescent provided by the present invention, being preformed with a serrate structure, the electrodes are soldered with electrode leads. This structure allows the electrodes to release thermal stress during thermal process. The yield can thus be enhanced.

In the planar fluorescent lamp of this invention, the electrodes include rod electrodes, by which the critical point is hardly produced and the fluorescent on the panel is difficult to scratch. The electrode assembly is not directional, so that the automatic production is easy.

In the present invention, the second panel and the glass rim can be fabricated separately and assembled later. Alternatively, the second panel and the glass rim can be fabricated integrally.

The rod electrodes are formed by soldering two, or more than two, electrode materials.

The rod electrode in the present invention includes an electrode and two electrode leads disposed at two sides of the electrode, or an electrode and an electrode lead disposed at one side of the electrode.

The rod electrode in the present invention includes a rod electrode material.

The rod electrode of the present invention includes an arbitrary circular material. An electrode material is then formed on the circular material.

In response to the circular structure of the electrode, the cross section of the recess for fixing the electrode includes a V-shape, a U-shape or a rectangular shape.

Both the foregoing general description and the following detailed description are exemplary and explanatory in nature only and are not bound by the restrictive definition of the invention, as claimed.

DESCRIPTION OF THE PREFERRED EMBODIMENTS

First Embodiment

Referring to FIGS. 4A to 4D, top and 3-D views of a planar fluorescent and the method fabricating the same in a first embodiment of the invention are shown.

Figure 1:
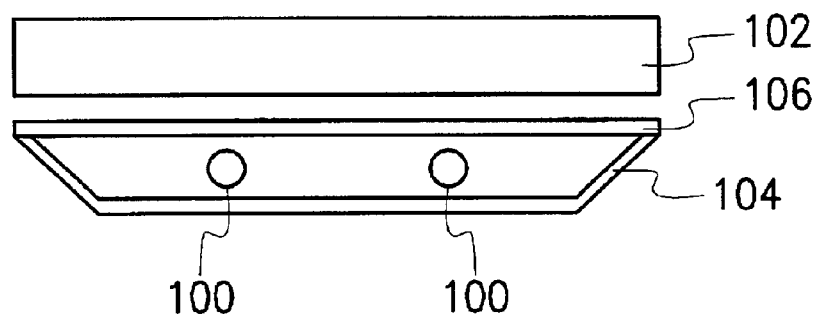
FIG. 1 shows a cross sectional of a conventional array back light.
Figure 2:
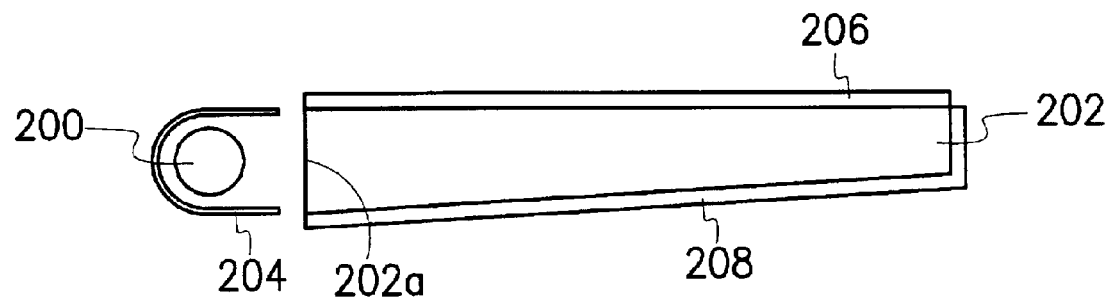
FIG. 2 shows a cross sectional view of a conventional edge-light back light.
Figure 3:
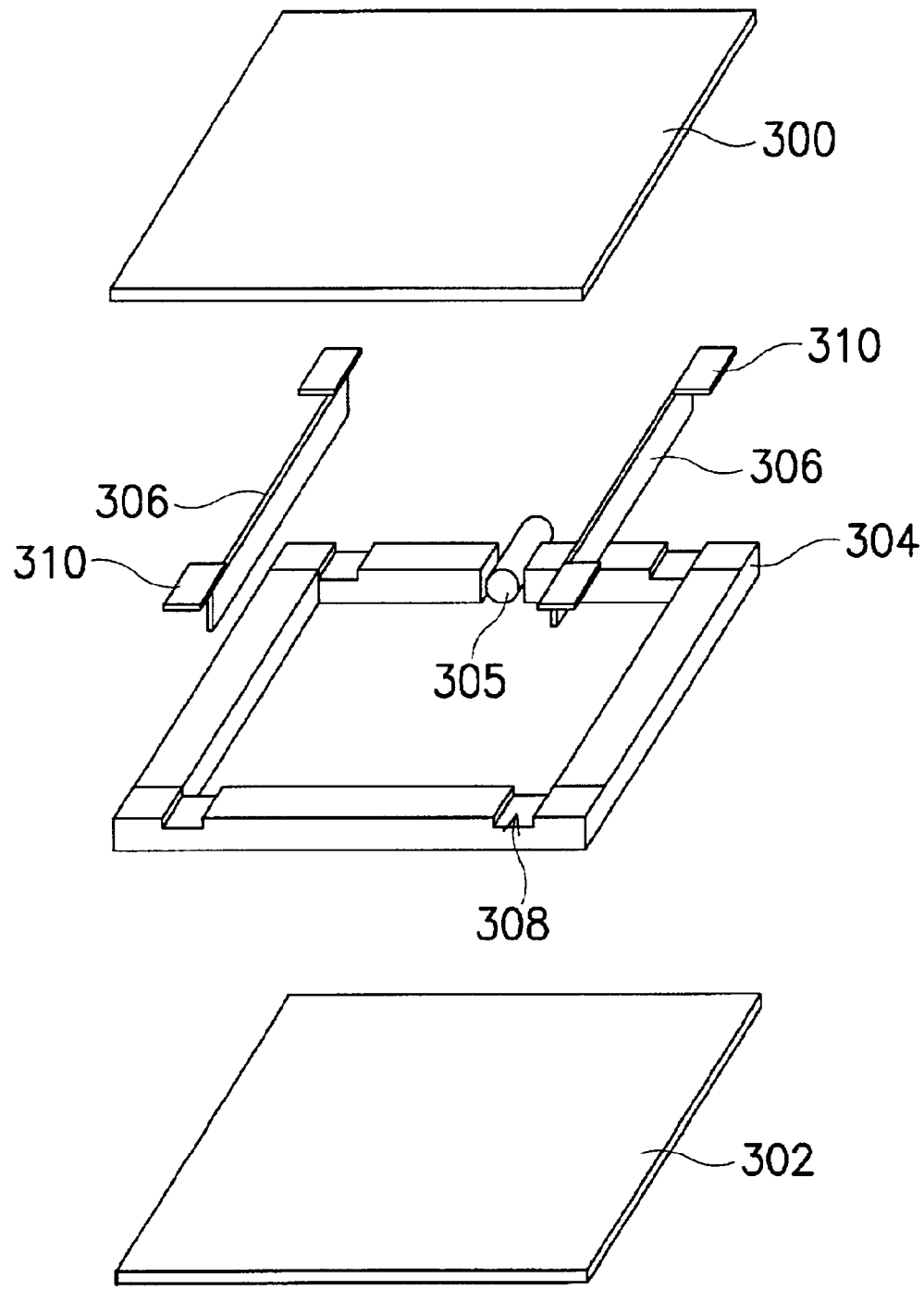
FIG. 3 shows an exploded view of a conventional planar fluorescent lamp.
Figure 4A:
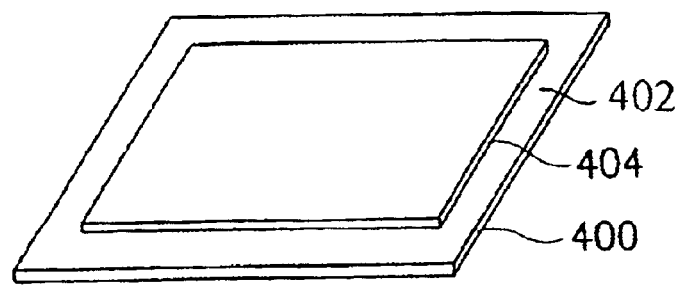
FIGS. 4A to 4D are top and 3-D views showing a first embodiment of a planar fluorescent and the method fabricating the same.

In FIG. 4A, a glass panel 400 is provided. A fluorescent layer 404 is coated on a surface 402 of the glass panel 400. The method for forming the fluorescent layer 404 includes screen printing, wet dip and electrostatic coating. The material of the fluorescent layer 404 includes phosphor, for example, tri-wavelength phosphor which can absorb ultraviolet light to emit blue, red and green lights. The thickness H of the glass panel 400 is about 2 mm to about 5 mm, preferably 3 mm. The material of the glass panel 400 includes soda-lime glass such as Corning®0800 glass or Corning®7059 glass.

Figure 4B:
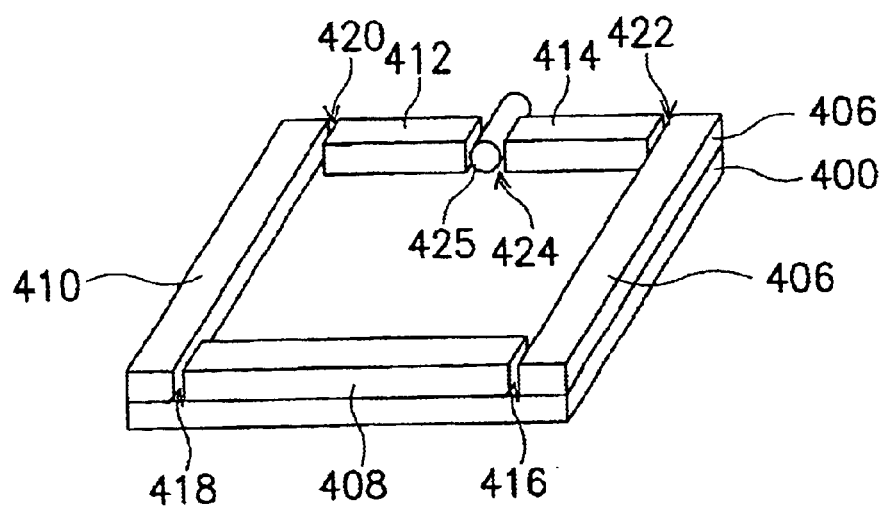

Referring to FIG. 4B, a glass frit is used to fix the glass rims 406, 408, 410, 412 and 414 on an edge of the surface of the glass panel 400. Gaps are reserved between glass rims 406 and 408, glass rims 408 and 410, glass rims 410 and 412, and glass rims 414 and 406 as the electrode seats 416, 418, 420 and 422. A venting orifice 424 is also reserved in the glass rims 412 and 414 for installation of venting tube 425 in the subsequent process.

Figure 4C:
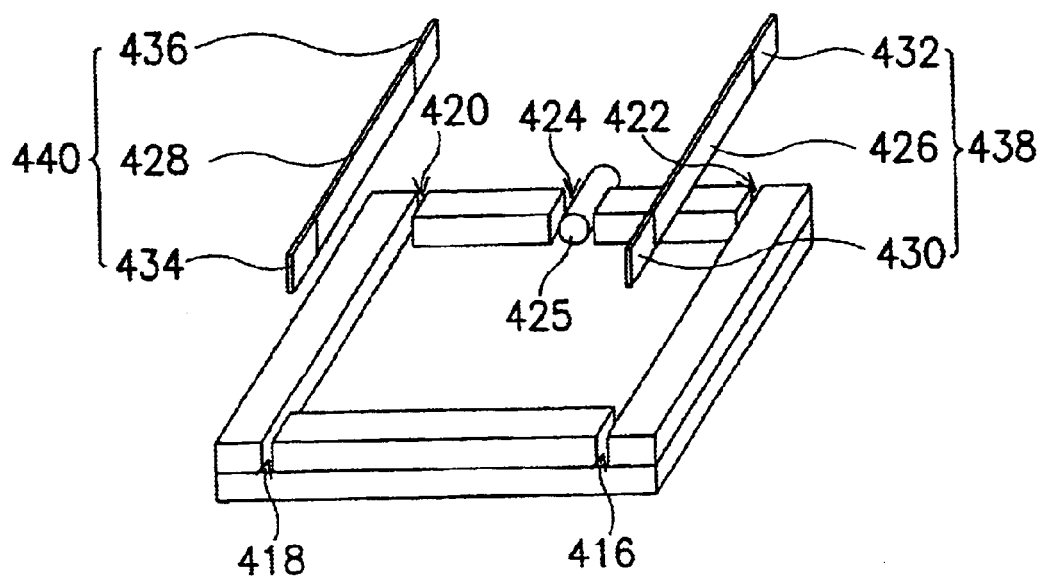

Referring to FIG. 4C, the electrode leads 430, 432, 434 and 436 are directly soldered to two sides of the electrode panels 426 and 428 to form electrodes 438 and 440. The electrode leads 430, 432, the electrode panels 426, the electrode leads 434, 436, and the electrode panel 428 are on the same plane. The electrodes 438, 440 are installed in the electrode seats 416, 422, 418 and 420. The electrode leads 430, 432 and 434, 436 of the electrodes 438, 440 are disposed in the electrode seats 416, 422, 420 and 422, respectively. The glass frit is filled in the venting hole 424 and the electrode seats 416, 418, 420, 422 for mounting the venting tube 425 and the electrodes 438, 440.

Figure 4D:
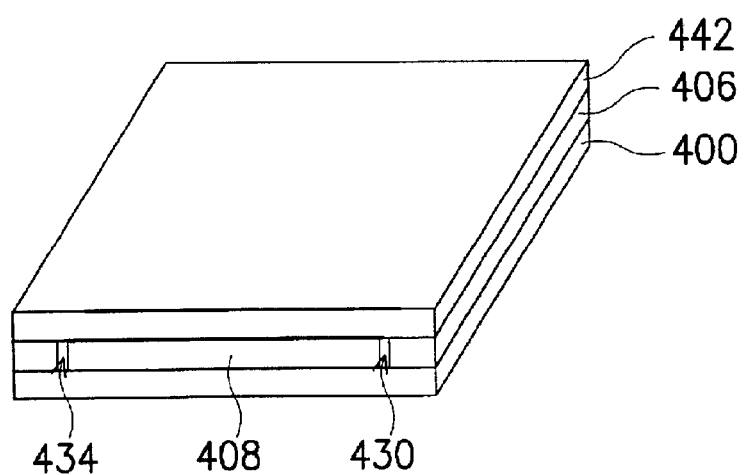

Referring to FIG. 4D, another glass panel 442 is provided. A fluorescent material such as phosphor layer (not shown) is coated on an internal surface of the glass panel 442. The method for forming the fluorescent layer includes screen printing, wet dip and electrostatic coating. The material of the fluorescent layer includes phosphor fluorescent material, tri-wavelength phosphor able to absorb ultra-violet light to generate the red light, the green light and the blue light. The glass panel 442 has a specification the same as the glass panel 400. The glass panel 442 is aligned with the glass panel 400, and the glass frit is used to mount the glass panel 442 on the glass rims 406, 408, 410, 412, 414 and 416.

When the glass material includes the Soda-Lime glass Corning®0800 fabricated by Corning glass corp., the glass frit to join two glass panels may include the Corning®7575 glass frit fabricated by Corning Glass corp. If the glass material includes the hard-board glass Corning®7059 fabricated by Corning Glass Corp., the glass frit may be selected from the Corning®1301 glass frit.

After mounting the glass panel 442 on the glass rims 406, 408, 410, 412, 414 and 416 to accomplish bulk of the planar fluorescent lamp, a cavity (not shown) is vacuumed via the venting tube 425. Mercury vapor and inert gas are then introduced into the cavity, which is then sealed from external.

Second Embodiment

Figure 5:
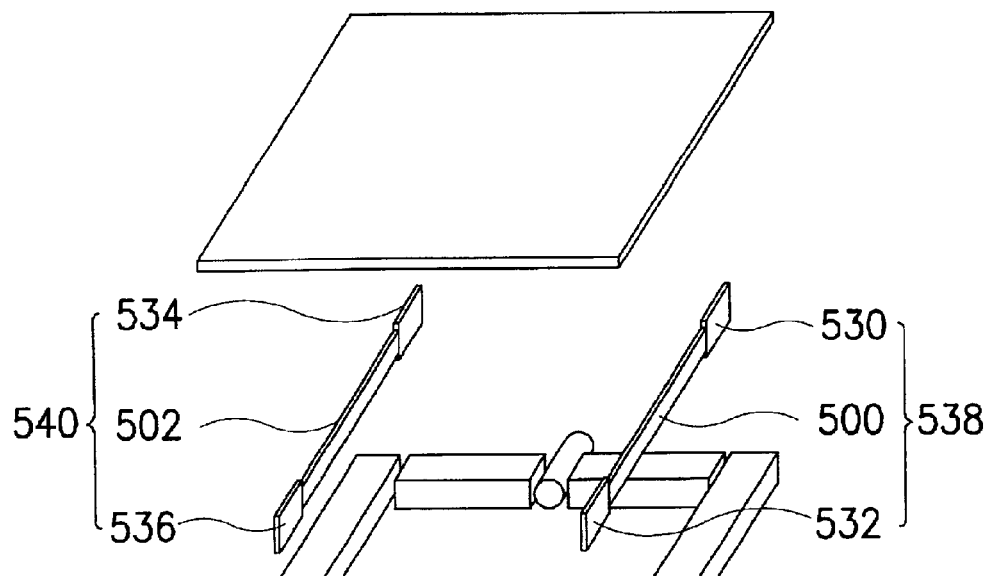
FIG. 5 shows an exploded view of a second embodiment of a planar fluorescent lamp.
Figure 5:
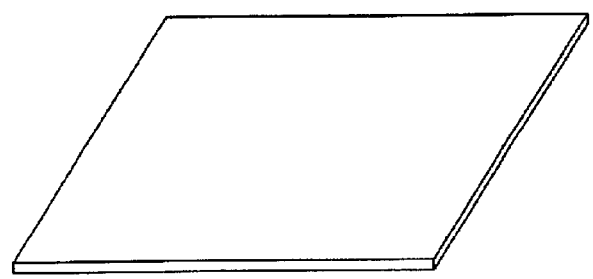

The fabrication method for the planar fluorescent lamp provided in the second embodiment is the same as that in the first embodiment. The difference is the fabrication method of the electrodes 438, 440. Referring to FIG. 5, the electrodes 538, 540 are formed by directly soldering the electrodes panels 500, 502 with the electrode leads 530, 532 and 534, 536.

Third Embodiment

Figure 6A:
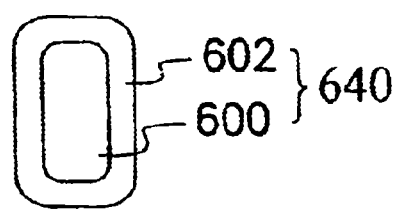
FIG. 6A shows a cross sectional view of an electrode of a planar fluorescent lamp in the third embodiment.

The fabrication method for the planar fluorescent lamp provided in the third embodiment is the same as that in the first embodiment. The difference is the fabrication method of the electrodes 638, 640. Referring to FIG. 6A, a cross sectional view of an electrode is shown. An electrode lead 600 is provided. The length of the electrode lead 600 is about the sum of the lengths of the electrode 500 and the electrode leads 530, 532. At a proper position, a material layer 602 made of the electrode material is formed to wrap the electrode lead 600, so as to form an electrode 640. Similarly, the electrodes 638, 640 are formed. The method for fanning the material layer 602 includes electroplating, for example.

Figure 6B:
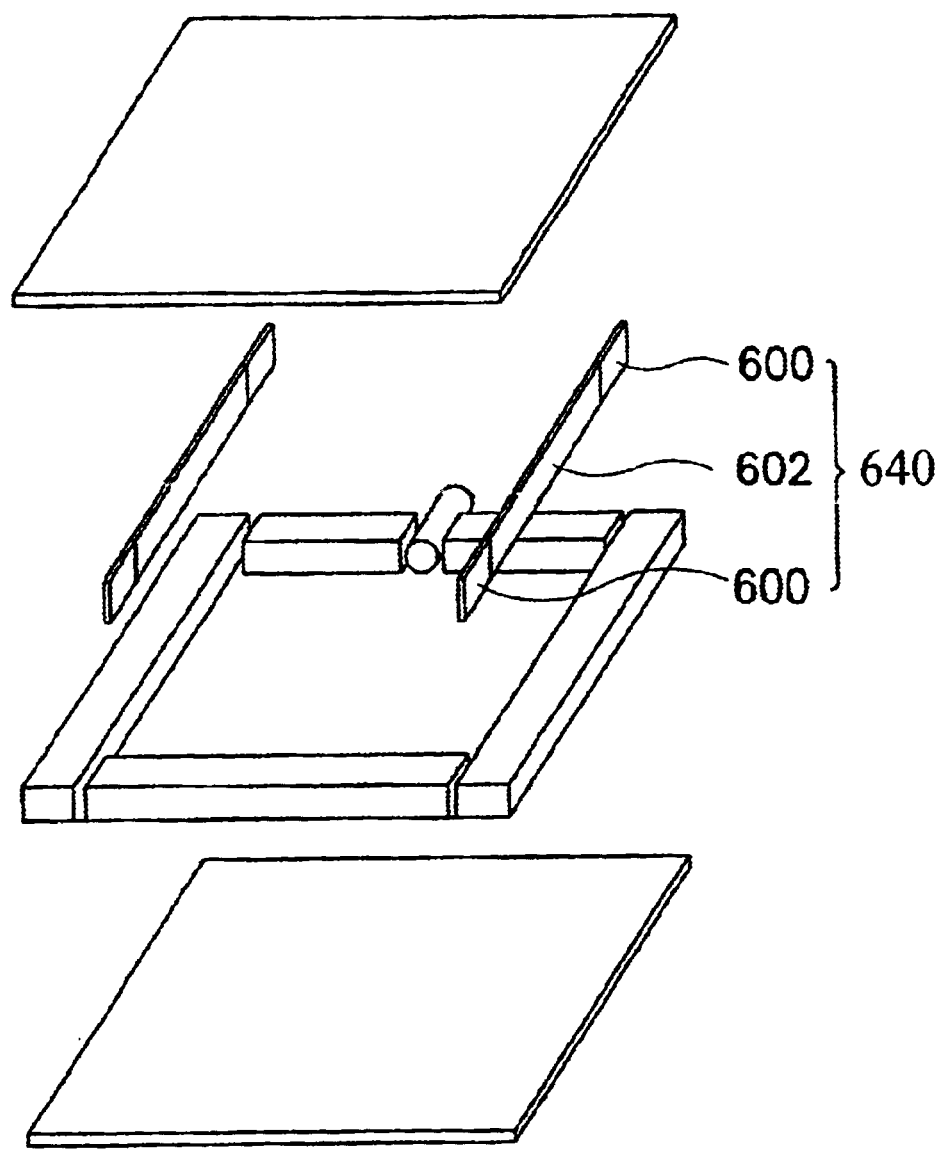
FIG. 6B is an exploded view of the planar fluorescent lamp in the third embodiment.

Referring to FIG. 6B, similar to the previous embodiment, the electrodes 638, 640 are disposed in the electrode seats 622, 624, 620 and 626 between the glass rims 610 and 612, 612 and 614, 614 and 616, 618 and 610. The length of the material layer 602 is the distance between the glass rims 612 and 618.

Figure 7A:
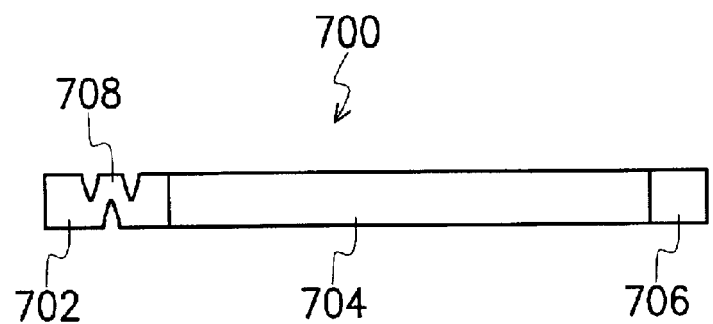
FIGS. 7A to 7C show a first method for fabricating an electrode.
Figure 7B:
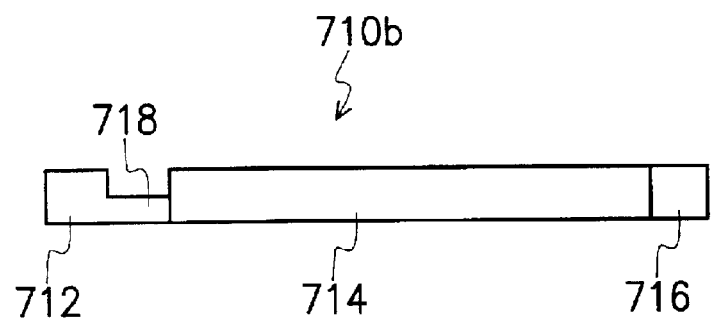
Figure 7C:
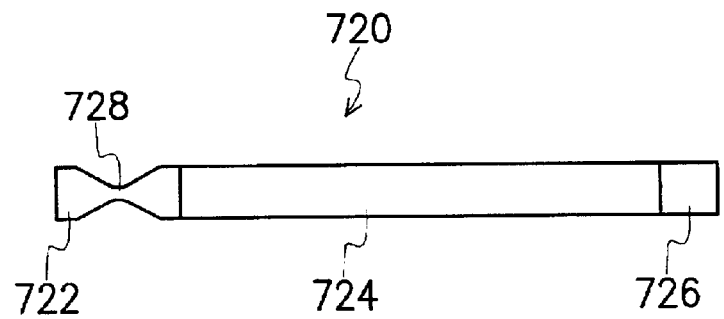

In addition, several methods for forming the electrodes are also available and applicable to the above embodiments for releasing thermal stress during thermal process. As shown in FIGS. 7A to 7C, the electrode leads 702, 712 and 722 are preformed, so that neck narrow areas such as 708, 718 and 728 are produced to release the thermal stress of the electrode during thermal process, so as to enhance the yield. The electrodes 704, 714, 724 are then soldered with the electrode leads 706, 716 and 726. The electrode leads 702, 706, 712, 716 are then fixed in the gap in the supporting member.

Figure 8:
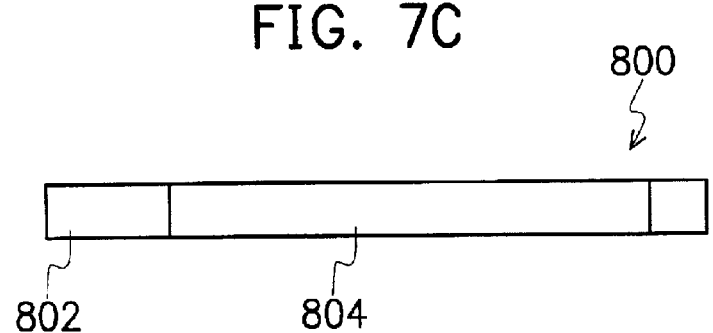
FIG. 8 shows a second method for fabricating an electrode.

As shown in FIG. 8, the electrode lead 802 has a length equal to the total amount of the conventional electrode and electrode lead. An electrode conductive material is formed at a position for forming the electrode 804. As mentioned above, the solder lead 802 is directly mounted in the gap of the supporting member. The portion 804 coated with the electrode conductive material is located at an interior of the planar fluorescent lamp, while the portion without the electrode conductive material is located at the supporting member and an exterior of the planar fluorescent lamp. Two electrodes are attached to the supporting member and parallel to each other. After forming the planar fluorescent lamp, the electrode lead exposed in the exterior is then twisted for connecting to external circuits.

Figure 9A:
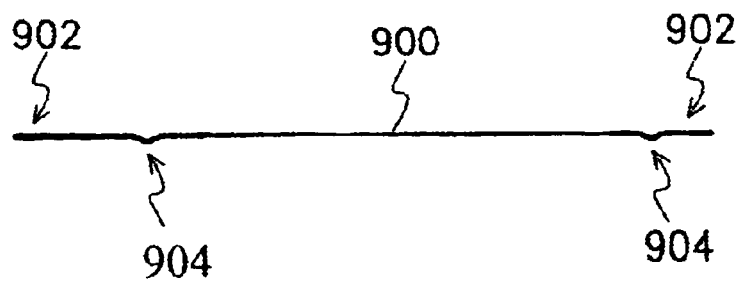
FIGS. 9A and 9B show a third method for fabricating an electrode.
Figure 9B:
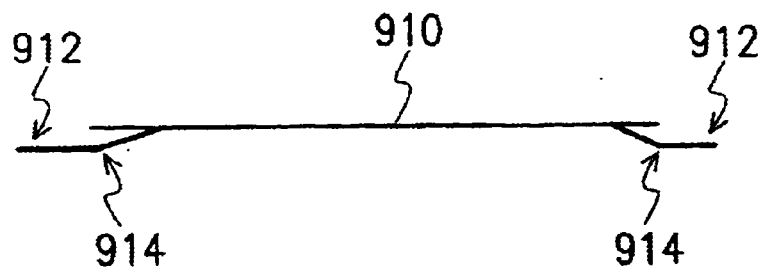
Figure 10A:
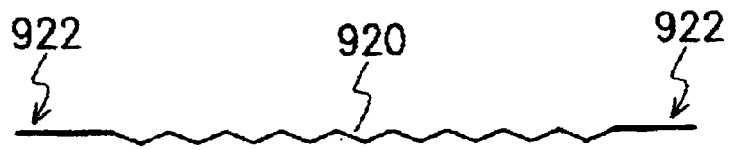
FIGS. 10A and 10B show a fourth method for fabricating an electrode.
Figure 10B:
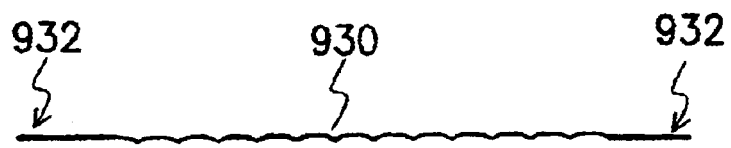

As shown in FIGS. 9A and 9B, the soldered electrodes 900, 910 and the electrode leads 902, 912 can be bent to reserve flexible spaces 904, 914, so as to release the thermal stress during thermal process to enhance the yield. Further, as shown in FIGS. 10A and 10B, the electrodes 920, 930 can be pre-formed with a serration structure, and then soldered with the electrode leads 922, 932 to allow the release of thermal stress during thermal process, so as to enhance yield.

Figure 11:
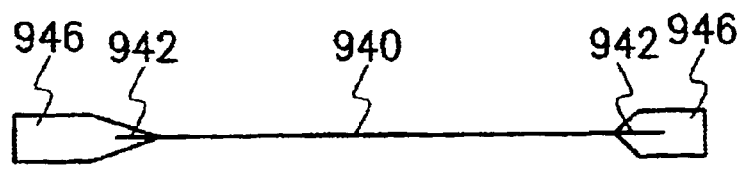
FIG. 11 shows a fifth method for fabricating an electrode.

As shown in FIG. 11, the solder between the electrode 940 and the electrode lead 942 does not have to be twisted with an angle. Therefore, the electrode itself does not need processing to a rectangular shape to advantage soldering with the electrode lead. Instead, the linear electrode 940 is soldered with the electrode lead 942. The electrode lead is directly fixed in the gap of the supporting member 946 as mentioned above. Two parallel electrodes are then installed by being attached to the supporting member. After forming the planar fluorescent lamp, the electrode lead exposed externally is then twisted as required to advantage the connection to external circuits.

Fourth Embodiment

Figure 12:
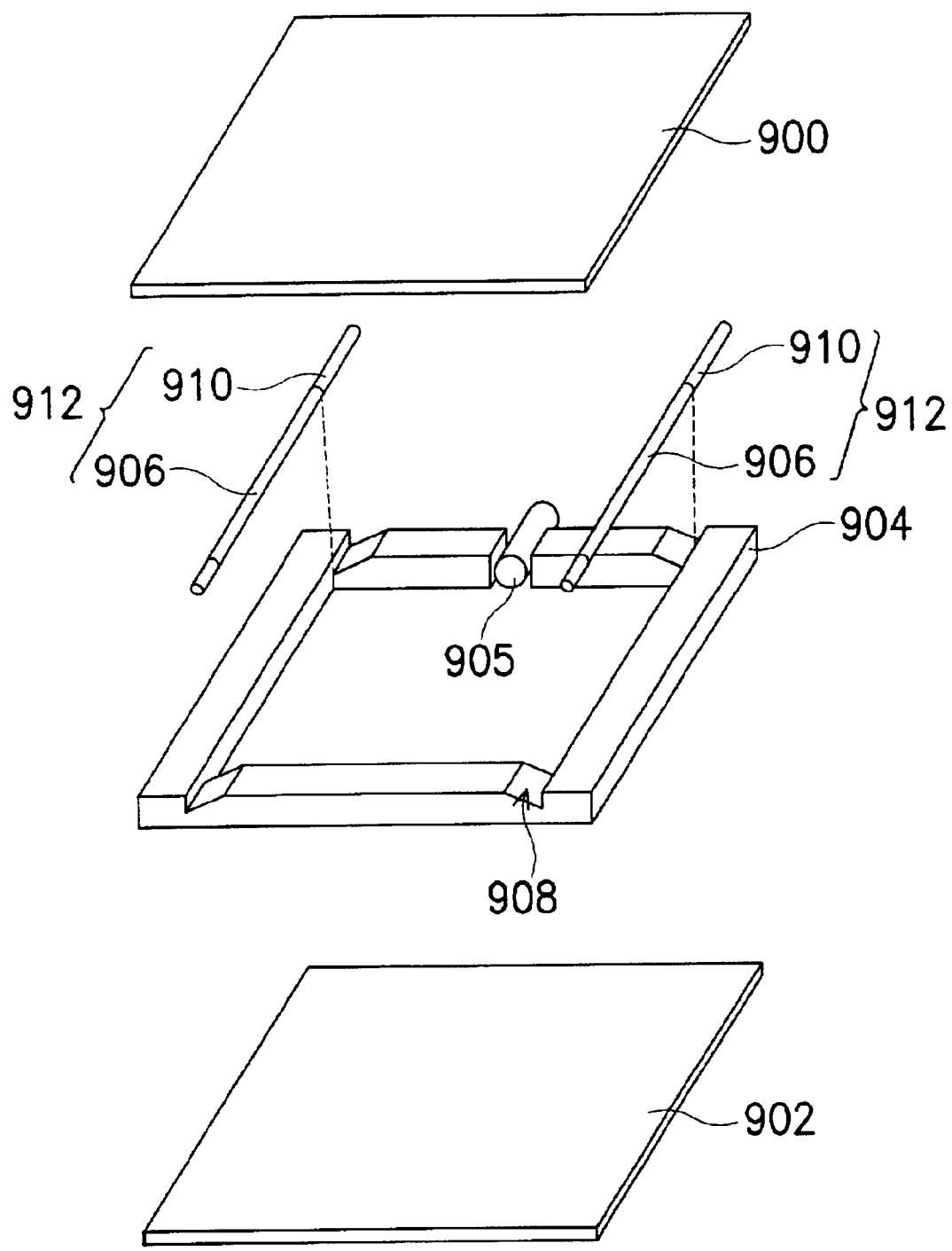
FIG. 12 shows an exploded view of a first type planar fluorescent in a fourth embodiment of the invention.

Referring to FIG. 12, a fourth embodiment of a planar fluorescent lamp is shown. The planar fluorescent lamp has a first panel 900, a second panel 902, a glass rim 904, a venting tube 905 and a set of rod electrode structures 912. The set of rod electrode structures 912 includes an electrode 906 and two electrode leads 910 disposed at two sides of electrodes 906. The coefficient of thermal expansion (CTE) of the electrode leads 910 is similar to that of glass material. The electrode leads 910 are thus suitably mounted on the glass rim 904 for packaging. The set of rod electrode structures 912 has a φ value of about 0.1 mm to about 2.0 mm.

The thickness of the first panel 900 and the second panel 902 is about 0.4 mm to about 10 mm, preferably 3 mm. The material of the first panel 900 and second panel 902 includes soda-lime glass such as Corning®0800 or Corning®7059 fabricated by Corning Glass Corp. The glass frits used for Corning®0800 and Corning®7059 include Corning®7575 and Corning®7059, respectively.

Referring to FIG. 12. Fluorescent layers (not shown) are formed on surfaces of the first panel 900 and the second panel 902. The method for forming the fluorescent layers includes screen printing, wet dip and electrostatic coating. The material for forming the fluorescent layers includes phosphor, such as the tri-wavelength phosphor able to absorb ultra-violet light to generate red, green and red lights.

The glass rim 904 is mounted at edges of the first panel 900 and the second panel 902. Recesses 908 are reserved in the glass rim 904 for installing the set of rod electrode structures 912. The reserved recesses 908 are located in response to the positions of the electrode leads 910 of the set of electrode structures 912. That is, the positions of the electrode leads 910 determine the positions of the recesses 908. By properly allocating the recesses, the rod electrode structures 912 are parallel to each other and closely attached to the glass rim 904. The recesses 908 reserved in the glass rim 904 have a V-shaped cross section. Thus, the rod electrode structures 912 naturally slide along the sidewall of the recesses 908 until being fixed therein. In addition, since the process of installing the rod electrode structures 912 in the recesses 908 does not have any directivity, it is thus advantageous to automatic production.

Referring to FIG. 12, the glass rim 904 can be joined with the second panel 902 first, and then joined with the first panel 900 later, for example. The joining process for the glass rim 904 and the second panel 902 includes using a glass frit to mount the glass rim 904 on an edge of the second panel 902. When the second panel 902 is made of the soda-lime glass Cornin®0800, Corning®7575 can be used as the glass frit. When the second panel 902 is made of the glass Corning®0800, the glass frit may be made of Corning®1301. In addition, the glass rim 904 and the second panel 902 can also be formed integrally.

A cavity is enclosed by the first panel 900, the second panel 902 and the glass rim 904. The cavity is vented via a venting tube 905 formed in a gap in the glass rim 904. The cavity is vented vacuumed first, and then mercury vapor and inert gas are introduced therein.

Figure 13:
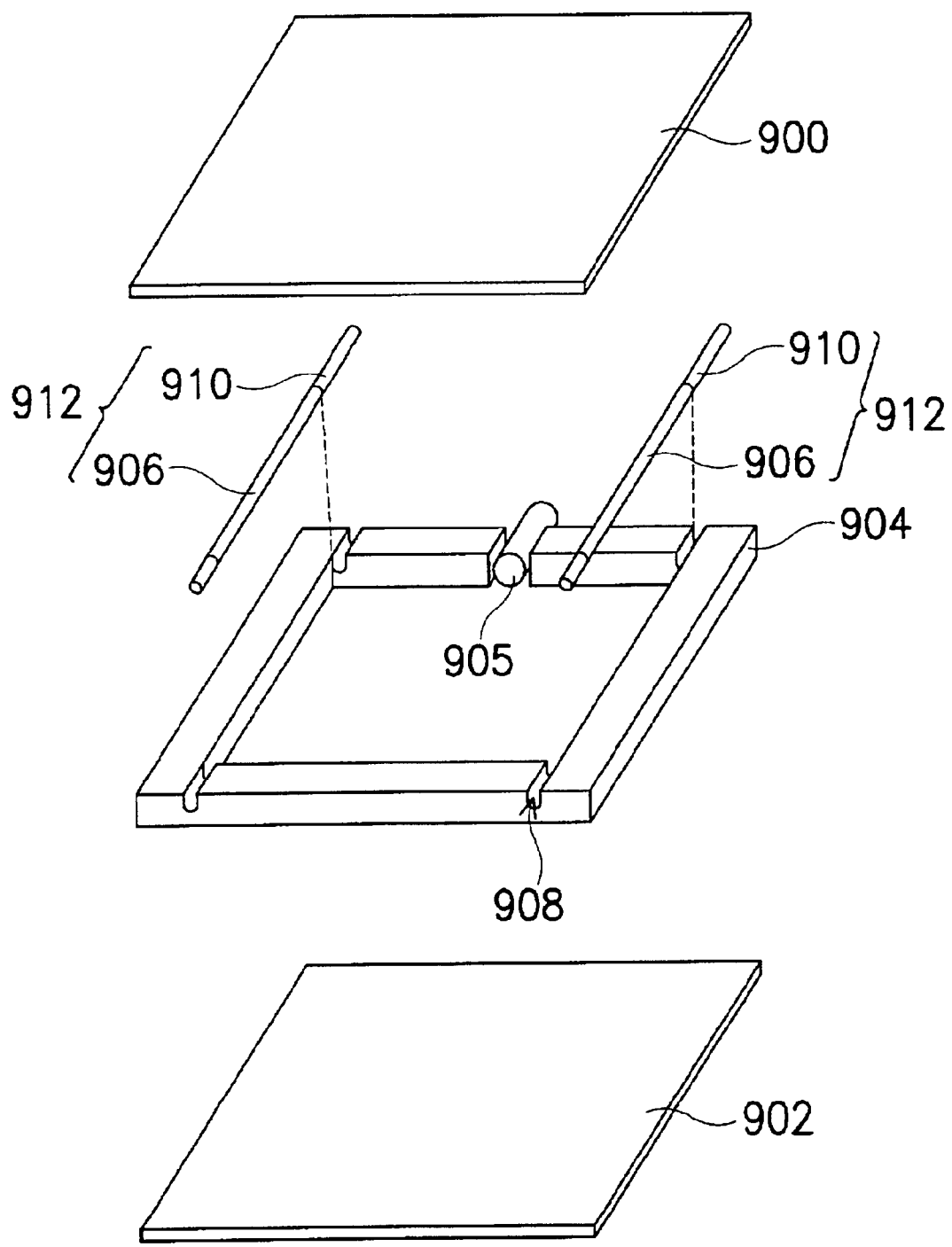
FIG. 13 shows an exploded view of a second type planar fluorescent in a fourth embodiment of the invention.

Referring to FIG. 13, an exploded of a second planar fluorescent lamp in the fourth embodiment is shown. In FIG. 13, the structure of the planar fluorescent lamp is similar to that as shown in FIG. 12 except that the recesses 908 in FIG. 13 have U-shaped cross sections. Both the V-shaped and U-shaped recesses have the function of fixing the rod electrode structures 912 therein.

Figure 14:
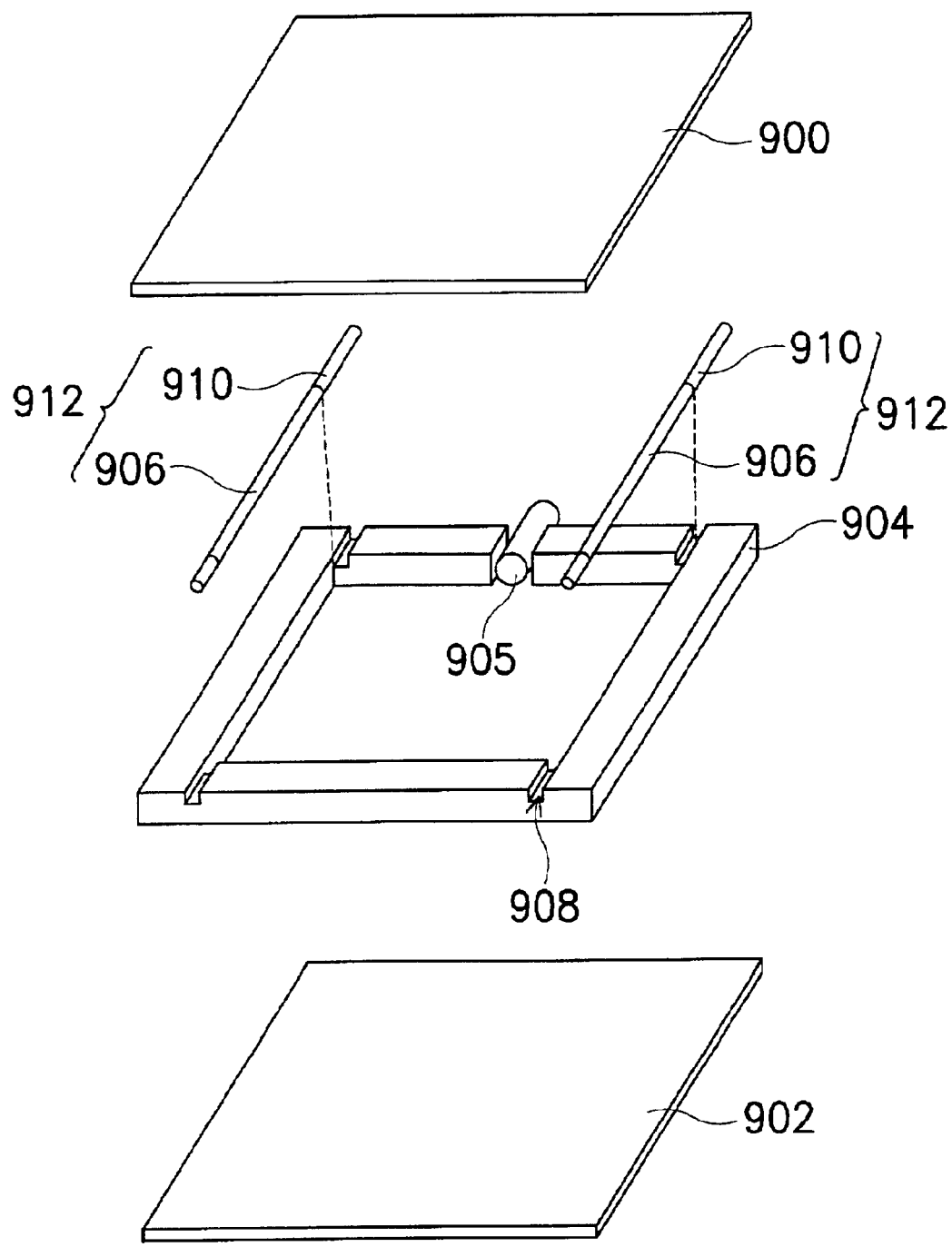
FIG. 14 shows an exploded view of a third type planar fluorescent in a fourth embodiment of the invention.

Referring to FIG. 14, an exploded of a third planar fluorescent lamp in the fourth embodiment is shown. In FIG. 14, the structure of the planar fluorescent lamp is similar to that as shown in FIG. 12 except that the recesses 908 in FIG. 13 have a rectangular shape. Both the V-shaped and rectangular recesses have the function of fixing the rod electrode structures 912 therein.

Fifth Embodiment

Figure 15:
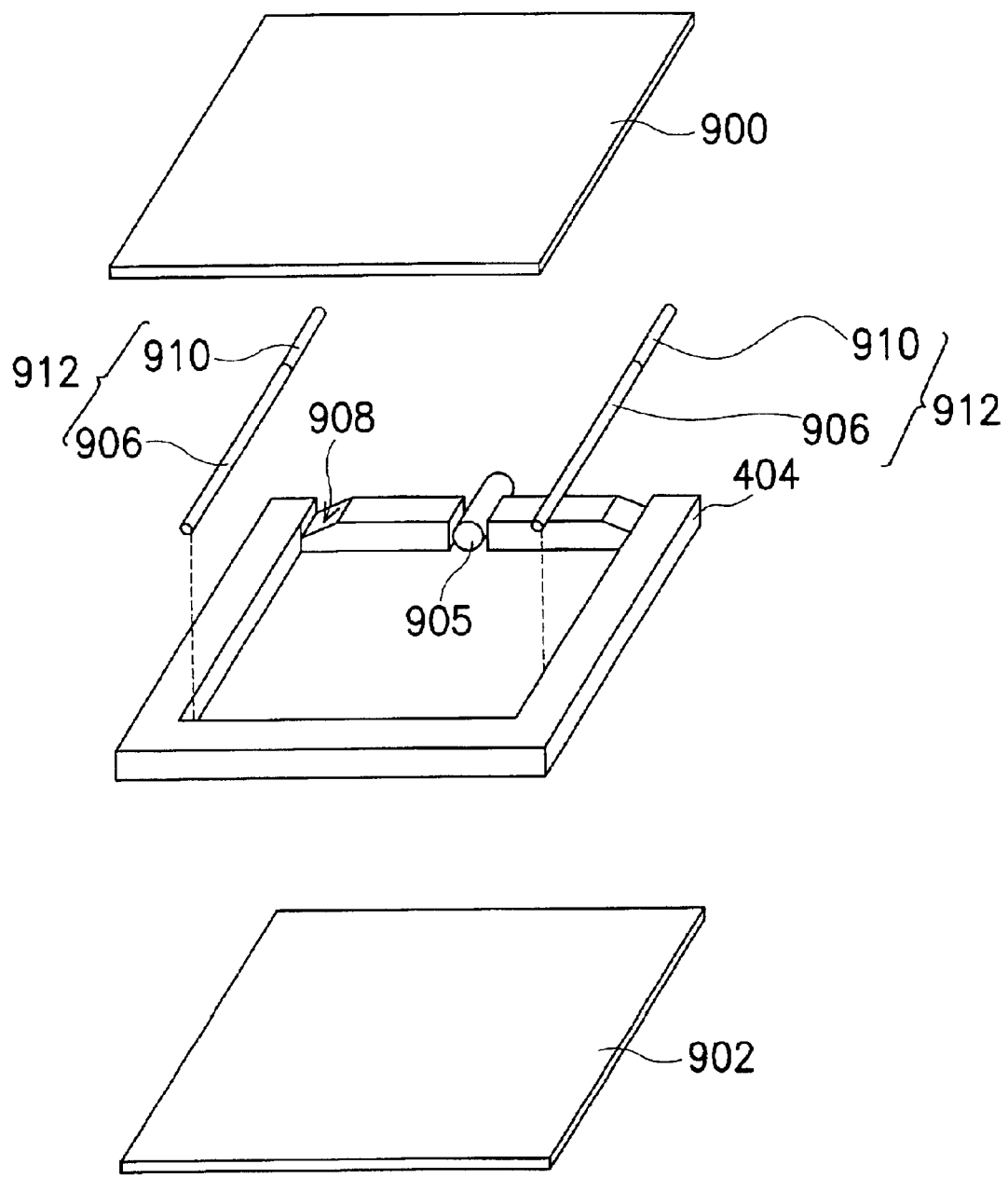
FIG. 15 shows an exploded view of a first type planar fluorescent in a fifth embodiment of the invention.
Figure 16:
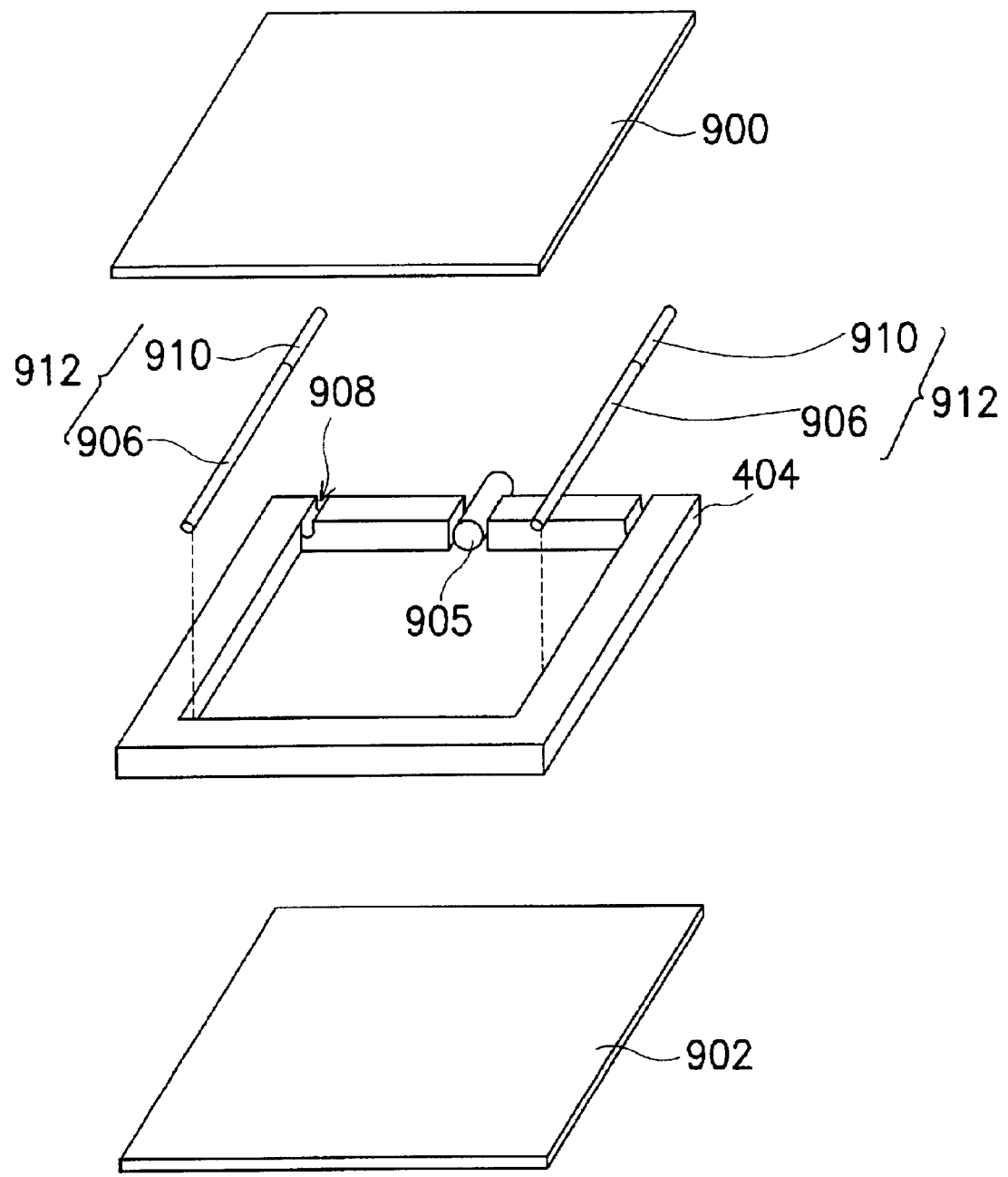
FIG. 16 shows an exploded view of a second type planar fluorescent in a fifth embodiment of the invention.
Figure 17:
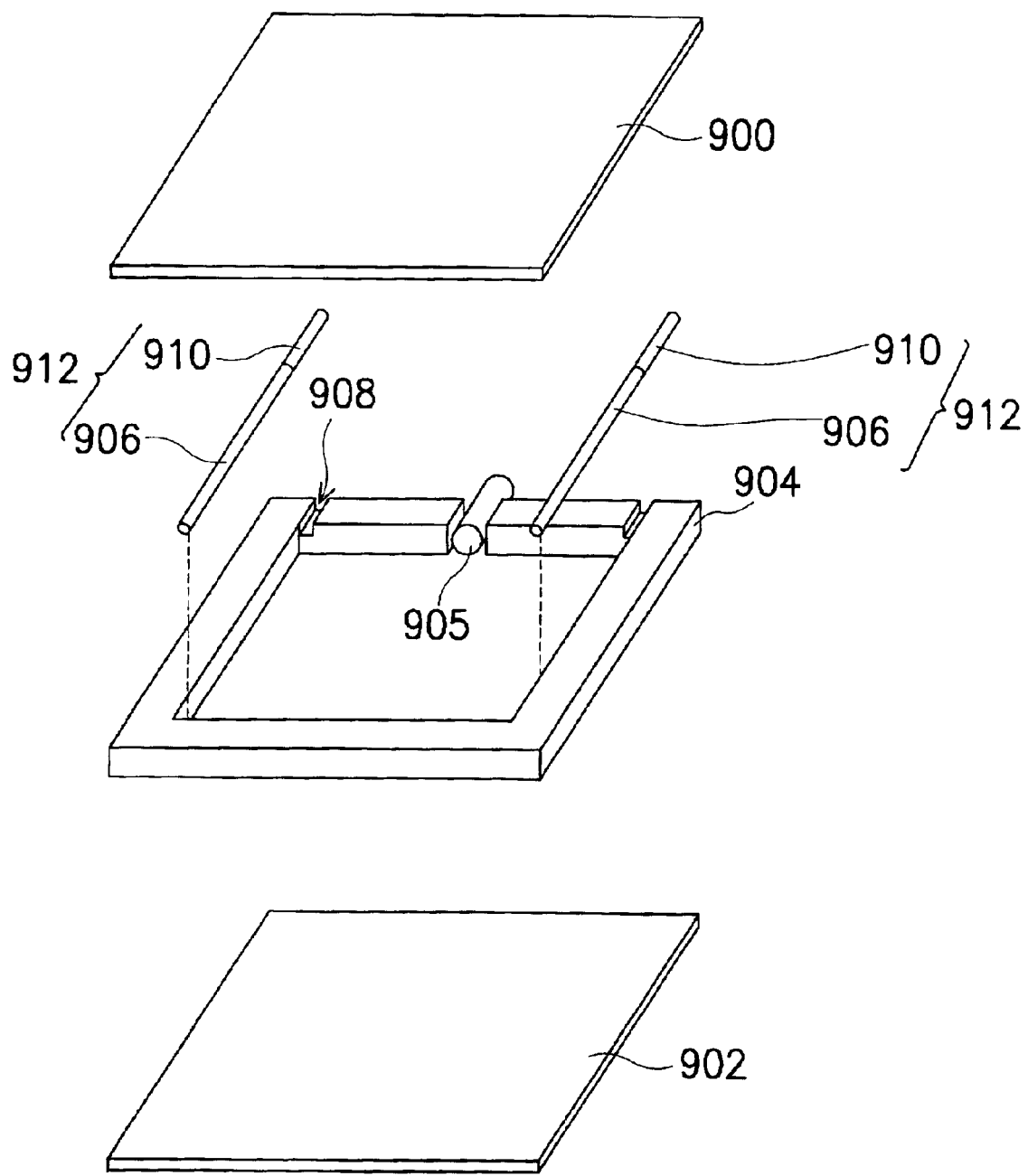
FIG. 17 shows an exploded view of a third type planar fluorescent in a fifth embodiment of the invention.

Referring to FIGS. 15–17, exploded of three planar fluorescent lamp structures are respectively shown. The fluorescent lamp structures in this embodiment are similar to that in the first embodiment as shown in FIGS. 12–14. The difference is in the rod electrode structures 912 and the positions of the reserved recesses 908.

Referring to FIGS. 15–17, the rod electrode structures 912 include an electrode 906 and an electrode lead 910 at one side of the electrode 906. The rod electrode structures 912 are mounted in the reserved recesses 908 of the glass rim 904.

The above rod electrode structures 912 have only one side mounted in the reserved recesses 908 in the glass rim 904, so that a better stress release effect is obtained.

The planar fluorescent lamp having the rod electrodes provided by the present invention has the following advantages.

1. The electrode of the planar fluorescent lamp is assembled with directivity due to the rod electrode structures. It is thus advantageous to automatic production of the electrodes.

2. In the present invention, the rod electrode of the planar fluorescent lamp does not have an edge sharp corner so that critical point that affects the luminescent characteristic are not easily formed.

3. The dimension alteration of the rod electrode of the planar fluorescent lamp is flexible so that a larger process window of the planar fluorescent lamp is obtained.

4. The rod electrode structure will hardly scratch the fluorescent layer.

5. The formation of the rod electrode is easier compared to that of other shapes of electrodes.

6. The glass rim is connected to the panels, or formed with the panel in oneness so that the fabrication is simplified.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A planar fluorescent lamp, comprising of:
   a first panel, having a first fluorescent layer thereon;
   a second panel, having a second fluorescent layer thereon;
   a glass rim, joined with edges of the first and second panels, wherein the glass rim has a plurality of electrode seats, and;
   two solid electrode structures, each having a solid slat electrode and two electrode leads at two ends of the slat electrode, wherein each electrode lead has a neck region.

2. The planar fluorescent lamp according to claim 1, wherein the electrode leads include flat panels.

3. The planar fluorescent lamp according to claim 1, wherein the glass rim further comprising a gap for installing a venting tube.

4. A planar fluorescent lamp, comprising of:
   a first panel, having a first fluorescent layer thereon;
   a second panel, having a second fluorescent layer thereon;
   a glass rim joined with edges of the first and second panels, wherein the glass rim has a plurality of electrode seats, and;
   two solid electrode structures, each having a solid slat electrode and two electrode leads at two ends of the slat electrode, wherein each slat electrode includes a bent serration structure.

5. The planar fluorescent lamp according to claim 4, wherein the electrode lead has a neck region.

6. The planar fluorescent lamp according to claim 4, wherein the electrode leads include a flat panel.

7. A planar fluorescent lamp, comprising of:
   a first panel, having a first fluorescent layer thereon;
   a second panel, having a second fluorescent layer thereon;
   a glass rim joined with edges of the first and second panels, wherein the glass rim has a plurality of recesses, and;
   a first solid rod electrode structure and a second solid rod electrode structures, wherein the first and second solid rod electrode structures are parallel to each other and closely attached to the glass rim via the recesses.

8. The planar fluorescent lamp according to claim 7, wherein each of the first and second solid rod electrode structures includes a solid rod electrode and two electrode leads at two sides of the electrode.

9. The planar fluorescent lamp according to claim 7, wherein the each of the first and second solid rod electrode structures includes a solid rod electrode and an electrode lead at one side of the electrode.

10. The planar fluorescent lamp according to claim 7, wherein each of the first and second solid rod electrode structures includes an electrode lead and an electrode material layer encircling the electrode lead.

11. The planar fluorescent lamp according to claim 7, wherein the recesses have V-shaped cross sections.

12. The planar fluorescent lamp according to claim 7, wherein the recesses have U-shaped cross sections.

13. The planar fluorescent lamp according to claim 7, wherein the recesses have rectangular shaped cross sections.

14. The planar fluorescent lamp according to claim 7, wherein the glass rim further comprises a gap therein for installing a venting tube.

* * * * *